United States Patent [19]

Ames et al.

[11] Patent Number: 5,787,053
[45] Date of Patent: Jul. 28, 1998

[54] CONTINUOUS FIBER PULSE REFLECTING MEANS

[75] Inventors: Gregory H. Ames, Gales Ferry; Jeffrey C. Gremillion, Salem, both of Conn.

[73] Assignee: The United States of America as represented by the Secretary of the Navy, Washington, D.C.

[21] Appl. No.: 380,480

[22] Filed: Jul. 7, 1989

[51] Int. Cl.[6] .................................. H04R 23/00; H04B 13/00
[52] U.S. Cl. ............................................................. 367/149
[58] Field of Search ........................... 367/140, 149; 350/96.1; 250/227, 227.11, 227.14, 227.16; 385/12, 13

[56] References Cited

U.S. PATENT DOCUMENTS

| 4,525,818 | 7/1985 | Cielo et al. | 367/149 |
| 4,545,253 | 10/1985 | Avicola | 367/140 |
| 4,649,529 | 3/1987 | Avicola | 367/149 |

Primary Examiner—Daniel T. Pihulic
Attorney, Agent, or Firm—Michael J. McGowan; Prithvi C. Lall; Michael F. Oglo

[57] ABSTRACT

A device for providing a controlled back-reflection of a preselected portion of incident fiber-guided light while minimizing the affect to light continuing down the fiber. The back-reflected light couples to the reverse traveling fiber mode with minimal loss. These devices are used as reflectors in a pulse sampled fiber optic hydrophone array.

12 Claims, 1 Drawing Sheet

CONTINUOUS FIBER PULSE REFLECTING MEANS

The invention described herein may be manufactured and used by or for the Government of the United States of America for governmental purposes without the payment of any royalties thereon or therefor.

BACKGROUND OF THE INVENTION

(1) Field of the Invention

The present invention relates to a fiber optic means for producing partial light beam reflectance and more particularly to a means for providing a low loss reflecting joint for use in an optical fiber sensor towed array.

(2) Description of the Prior Art

A co-pending U.S. patent application, Ser. No. 795,843 entitled "Pulse Sampled Fiber Optic Hydrophone Array", discussed several means for providing back-reflection. Such reflection may be accomplished by breaking into the fiber and inserting an optical reflective filter in the line. This filter may be a discrete component placed in the middle of an expanded beam fiber connection or an optical coating fabricated directly on one of the fiber faces. Such a technique typically suffers from high loss due to having to break into the fiber, or requires multi-step, high cost assembly techniques, either of which offsets its utility in multi-element fiber sensor systems. A second back-reflection method is to polish an optical fiber close to its core region and then introduce an optical grating to provide back-reflection at a specific wavelength. Disadvantages are generally high loss, lack of precise control of the amount of light reflected, the narrow spectral width of the reflection, and multi-step, high cost assembly. A third back-reflectance method utilizes a fiber optic coupler to divert a portion of the incident light out of the main fiber to a total reflector. All of the light is reflected and a small portion of this is coupled back onto the main fiber. Unfortunately, if only a small portion of light is coupled off, little of the reflected light is coupled back on resulting in high loss. No technique to date has simultaneously demonstrated low loss and precise control of the reflected light level.

SUMMARY OF THE INVENTION

Accordingly, it is a general purpose and object of the present invention to provide a low loss back-reflectance means for use in multi-element optical sensor systems.

It is a further object that such back-reflectance means be low in cost.

Another object is that such back-reflectance means provide precise control of the back-reflection level.

Still another object is that such back-reflectance means offer a large range of back-reflectance levels.

A still further object is that such back-reflectance means provide a polarization insensitive wide spectral response.

These objects are accomplished with the present invention by providing a device which, when inserted in or formed integral with a light transmitting fiber, precisely controls the back-reflection of a preselected portion of incident fiber-guided light while minimizing the affect on the remaining light continuing through the fiber. The back-reflected portion of light couples to the reverse traveling fiber mode with minimal loss. A plurality of these devices are used as the reflectors in a pulse sampled fiber optic hydrophone array.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
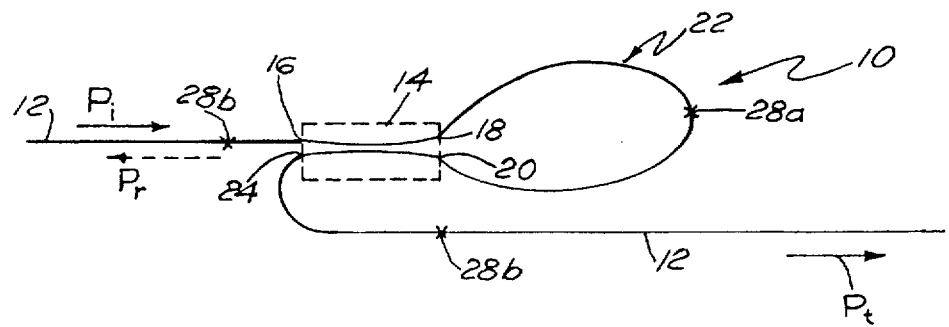
FIG. 1 shows a block diagram of the back-reflectance device of the present invention.

Referring now to FIG. 1 there is shown a back-reflectance optical device 10 according to the present invention. A pulse of incident coherent light $P_i$, traveling through an optical fiber 12, enters a low loss, fused, bi-conical taper type, four port fiber optic coupler 14 through a first port 16. Such optical couplers are commercially available. Light pulse $P_i$ is divided by coupler 14 between second and third ports 18 and 20 with a preselected ratio that is determined by the construction of coupler 14. As an example, a 90%/10% coupler will couple 10% of the light to port 20 and 90% to port 18. These divided light pulses then propagate around loop 22 to the opposite port. Each of these light pulses are again split by coupler 14 between first and fourth ports 16 and 24. In this example, the 90% light pulse arrives at port 20 and 10% of it is coupled to port 16 (0.9×0.1=9% of the original light pulse) while 90% of it is coupled to port 24 (0.9×0.9=81% of the original light pulse). The 10% light pulse travelling in the opposite direction in loop 22 arrives at port 18 and 10% of it is coupled to port 24 (0.1×0.1=1% of the original light pulse) while 90% of it is coupled to port 16 (0.1×0.9=9% of the original light pulse). The light pulse, $P_r$, from port 24 continues to be transmitted through fiber 12 in the original direction of travel to other parts of the system. The light pulse exiting from port 16, $P_r$ is returned as a back-reflectance along fiber 12 in the opposite direction from the original incident light pulse $P_i$. The percentage of the light back reflected is determined by the coupling ratio of fiber optic coupler 14. In this example 82% is transmitted and 18% is back-reflected by a 90%/10% coupler. Loop 22 may be formed using one or more low loss fusion splices, 28, the preferred embodiment employing a splice 28a to join the two leads of fiber optic coupler 14. Additional splices, 28b, may also be used to connect device 10 into fiber 12. Use of low loss splices and couplers result in low excess light loss.

Figure 2:
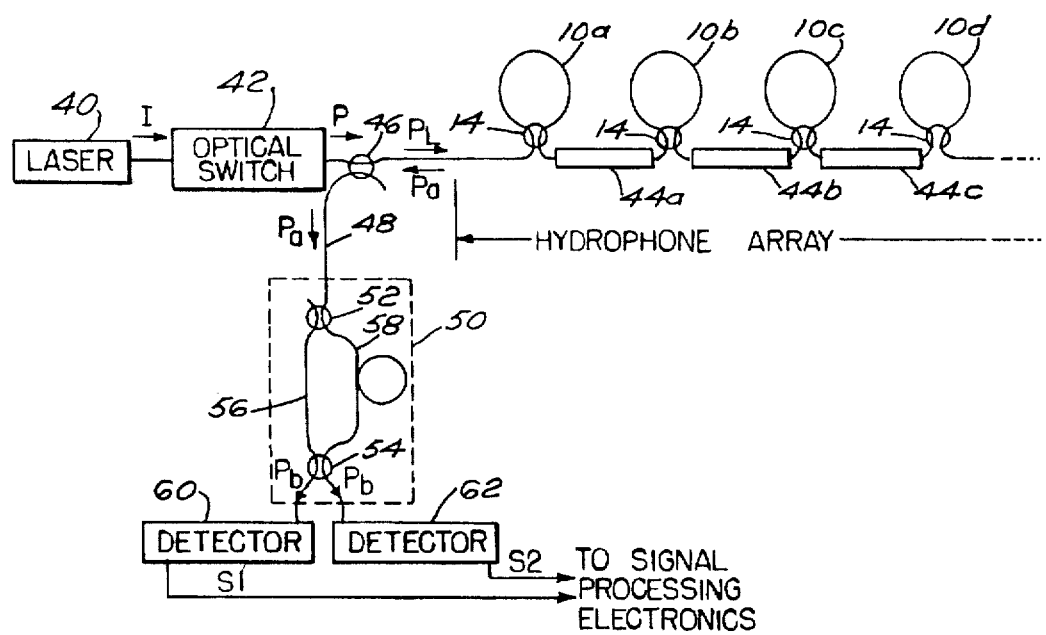
FIG. 2 shows a block diagram of an optical hydrophone array system using a plurality of the back-reflectance devices of FIG. 1.

Use of a back-reflecting optical fiber device 10 in a pulse sampled hydrophone array of the type described in the co-pending patent application cited above, is shown in FIG. 2. Light I from a continuous laser 40 is modulated by an optical switch 42 to create a train of light pulses P. These pulses are transmitted by a coupler 46 as pulses $P_L$ to a multi-element hydrophone array formed from a series connected plurality of reflector devices 10. Each pair of devices 10, identified as 10a, 10b, et seq. is separated by a corresponding fiber sensor region 44. For a particular sensor region, e.g., 44a, pulses are reflected from the reflector devices on either end, i.e., 10a and 10b. A portion of the reflected pulse $P_a$ from device 10a passes through coupler 46 and continues along fiber 48 to optical compensator 50. Compensator 50 further includes an input splitter joint 52, an output splitter joint 54, a short fiber lead 56 and a long fiber lead 58. The pulse from device 10a is delayed in fiber coil 58 while a portion of the pulse from device 10b passes through short path 56 to arrive at light detectors 60 and 62 simultaneously. The pulses recombine at the same time within coupler 54 and are equally split and transmitted to the two detectors. The two pulses. $P_b$, interfere according to the phase difference between them, thereby providing a means for measuring phase changes introduced in sensor region (44a) caused by its reaction with the incident sound field. The S1 and S2 outputs of detectors 60 and 62 are then transmitted to signal processing electronics.

Figure 3:
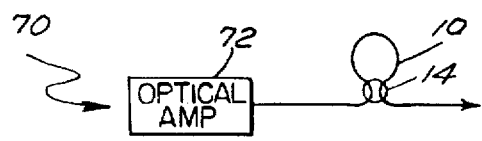
FIG. 3 shows a fiber pigtailed external cavity laser using the back-reflectance device of FIG. 1

FIG. 3 shows a fiber pigtailed external cavity laser 70 comprising an optical amplifier 72 which includes one or two (e.g. [diode] laser configuration) integral reflectors and a continuous fiber reflecting means 10. Laser 70 provides laser light of extremely narrow line widths. Laser 70 may also be used in place of laser 40 of FIG. 2.

The advantages of the present invention over the prior art are; low losses, precise control of the back-reflection level, a large range of possible back-reflection levels, low cost, a polarization insensitive response, and wide spectral response. Use of high quality couplers and fusion splices allows very low excess loss per device. It can be seen in FIG. 2 that the sensor array is formed of a single, continuous, optical fiber channel. This maintains low system loss and maximizes the number of possible sensor channels. Because couplers can be manufactured with accurate control of coupling ratio, the back-reflection level can be precisely controlled. This is absolutely necessary to allow the greatest number of sensor channels on a single fiber because each reflector in the line must have a different back-reflection in order for all reflected signals to be of equal strength at the receiver. In the case of an array of sensors on a single fiber, the back-reflection from the reflectors must increase with each successive reflector, from a few percent at sensor one to a high level of reflection at the last sensor, in order for the number of channels to be maximized. Readily available fused bi-conical taper couplers have coupling ratios which allow reflectors with a fraction of a percent reflectance up to nearly 50%. The present invention does not require use of any costly manufacturing techniques or processes, nor does it require costly multi-step or labor intensive assembly. Accurate and precise fused bi-conical taper couplers are commercially available and are low in cost. Low loss fusion splices are also routine and are not labor intensive, further contributing to the low cost character of this invention. Couplers are available which maintain their coupling ratios while providing very low sensitivity to polarization. Therefore, the reflection means does not lead to polarization variation in the system and conversely, polarization variations do not affect the performance of this device. The reflection means is thus inherently wide band with couplers capable of maintaining their coupling ratios over a fairly broad wavelength range.

What has thus been described is a device for providing a controlled back reflection of a portion of incident fiber-guided light while minimizing the affect to light continuing down the fiber. The back reflected light couples to the reverse traveling fiber mode with minimal loss. These devices are used for the reflectors in a pulse sampled fiber optic hydrophone array.

Obviously many modifications and variations of the present invention may become apparent in light of the above teachings. For example: The array could be manufactured by forming the couplers in a single continuous length of fiber, thus eliminating the fusion splices and reducing loss.

In light of the above, it is therefore understood that within the scope of the appended claims, the invention may be practiced otherwise than as specifically described.

What is claimed is:

1. A hydrophone array system, comprising:

continuous laser means adapted to produce continuous laser light therefrom;

optical modulator means, connected to said continuous laser means, for receiving said continuous laser light from said continuous laser means and producing an optical pulse P therefrom;

optical coupler means, connected to said optical modulator means, for receiving said optical pulse P from said optical modulator means and producing optical pulse $P_L$ therefrom;

pulse sampled optical fiber hydrophone array means, connected to said optical coupler means, for receiving said optical pulse $P_L$ from said optical coupler means and producing back-reflected optical pulses $P_a$ therefrom, said pulse sampled optical fiber hydrophone array means further comprising a plurality of serially arranged optical fiber hydrophone sensor means, and a plurality of continuous fiber pulse reflecting means, one each connected to each end of one of said pulse sampled optical fiber hydrophone sensor means, for receiving said optical pulse $P_L$ from said optical coupler means and producing said optical back-reflected pulses $P_a$ therefrom;

optical pulse delay and recombining means, connected to said optical coupler means, for receiving said back-reflected optical pulses $P_a$ from said pulse sampled optical fiber hydrophone array means via said optical coupler means and producing first and second optical pulses $P_b$ therefrom;

first optical detector means, connected to said optical pulse delay and recombining means, for receiving said first optical pulse $P_b$ from said optical pulse delay and recombining means and producing system output electrical signal S1; and second optical detector means, connected to said optical pulse delay and recombining means, for receiving said second optical pulse $P_b$ from said optical pulse delay and recombining means and producing system output electrical signal S2 therefrom.

2. A hydrophone array system, comprising:

continuous laser means, adapted to produce continuous laser light therefrom;

optical modulator means, connected to said continuous laser means, for receiving said continuous laser light from said continuous laser means and producing an optical pulse P therefrom;

optical coupler means, connected to said optical modulator means, for receiving said optical pulse P from said optical modulator means and producing optical pulse $P_L$ therefrom;

pulse sampled optical fiber hydrophone array means, connected to said optical coupler means, for receiving said optical pulse $P_L$ from said optical coupler means and producing back-reflected optical pulses $P_a$ therefrom, said pulse sampled optical fiber hydrophone array means further comprising a plurality of serially arranged optical fiber hydrophone sensor means, and a plurality of continuous fiber pulse reflecting means, one each formed integral with each end of said pulse sampled optical fiber hydrophone sensor means, for receiving said optical pulse $P_L$ from said optical coupler means and producing said optical back-reflected pulses $P_a$ therefrom;

optical pulse delay and recombining means, connected to said optical coupler means, for receiving said back-reflected optical pulses $P_a$ from said pulse sampled optical fiber hydrophone array means via said optical coupler means and producing first and second optical pulses $P_b$ therefrom;

first optical detector means, connected to said optical pulse delay and recombining means, for receiving said first optical pulse $P_b$ from said optical pulse delay and recombining means and producing system output electrical signal S1; and second optical detector means, connected to said optical pulse delay and recombining means, for receiving said second optical pulse $P_b$ from said optical pulse delay and recombining means and producing system output electrical signal S2 therefrom.

3. An apparatus according to claim 1 wherein each said continuous fiber pulse reflecting means further comprises a fused biconical taper fiber optic coupler means, for receiving said incident optical pulse $P_L$ and producing a reflected pulse $P_r$ and a transmitted pulse $P_t$ therefrom.

4. An apparatus according to claim 2 wherein each said continuous fiber pulse reflecting means further comprises a fused biconical taper fiber optic coupler means, for receiving said incident optical pulse $P_L$ and producing a reflected pulse $P_r$ and a transmitted pulse $P_t$ therefrom.

5. A fiber pigtailed external cavity laser, comprising:
fiber pigtailed optical amplifier means, for providing one half of a resonant optical cavity having a gain greater than one; and
continuous fiber reflecting means, connected to said fiber pigtailed optical amplifier means, for providing the second half of said resonant optical cavity and producing, in conjunction therewith, laser light of narrow line widths therefrom.

6. An apparatus according to claim 5 wherein said continuous fiber reflecting means further comprises a fused biconical taper fiber-optic coupler means, for receiving incident optical laser light and producing reflected laser light and transmitted laser light therefrom.

7. A fiber pigtailed external cavity laser, comprising:
fiber pigtailed optical amplifier means, for providing one half of a resonant optical cavity having a gain greater than one; and
continuous fiber reflecting means, formed integral with said fiber pigtailed optical amplifier means, for providing the second half of said resonant optical cavity and producing, in conjunction therewith, laser light of narrow line widths therefrom.

8. An apparatus according to claim 7 wherein said continuous fiber reflecting means further comprises a fused biconical taper fiber-optic coupler means, for receiving incident optical laser light and producing reflected laser light and transmitted laser light therefrom.

9. A fiber pigtailed external cavity laser, comprising:
fiber pigtailed laser means, for providing laser light of wide line widths;
continuous fiber reflecting means, connected to said fiber pigtailed laser means, for receiving said laser light of wide line widths and producing laser of narrow line widths therefrom.

10. An apparatus according to claim 9 wherein said continuous fiber reflecting means further comprises a fused biconical taper fiber-optic coupler means, for receiving incident optical laser light and producing reflected laser light and transmitter laser light therefrom.

11. A fiber pigtailed external cavity laser, comprising:
fiber pigtailed laser means, for providing laser light of wide line widths;
continuous fiber reflecting means, formed integral with said fiber pigtailed laser means, for receiving said laser light of wide line widths light and producing laser light of narrow line widths therefrom.

12. An apparatus according to claim 11 wherein said continuous fiber reflecting means further comprises a fused biconical taper fiber-optic coupler means, for receiving incident optical laser light and producing reflected laser light and transmitted laser light therefrom.

* * * * *